United States Patent
Karasaridis et al.

(10) Patent No.: US 7,962,613 B2
(45) Date of Patent: Jun. 14, 2011

(54) SYSTEM AND METHOD FOR MODIFYING AN ALLOCATION SCHEME BASED ON A RESOURCE UTILIZATION

(75) Inventors: Anestis Karasaridis, Oceanport, NJ (US); David Hoeflin, Middletown, NJ (US); Yonatan A. Levy, Manalapan, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 222 days.

(21) Appl. No.: 12/271,256

(22) Filed: Nov. 14, 2008

(65) Prior Publication Data
US 2010/0125656 A1 May 20, 2010

(51) Int. Cl.
*G06F 15/173* (2006.01)
*G06F 15/16* (2006.01)
(52) U.S. Cl. .................... 709/224; 709/226; 709/217
(58) Field of Classification Search .............. 709/204, 709/220–228, 201, 209; 370/270, 465, 477, 370/351–358; 310/26–28; 705/4
See application file for complete search history.

(56) References Cited

U.S. PATENT DOCUMENTS

| 6,070,191 | A | * | 5/2000 | Narendran et al. ........... 709/226 |
| 7,072,979 | B1 | | 7/2006 | Aviani, Jr. et al. |
| 7,111,061 | B2 | | 9/2006 | Leighton et al. |
| 7,653,689 | B1 | * | 1/2010 | Champagne et al. ......... 709/206 |
| 2001/0052016 | A1 | | 12/2001 | Skene et al. |
| 2002/0010798 | A1 | * | 1/2002 | Ben-Shaul et al. ........... 709/247 |
| 2002/0078233 | A1 | * | 6/2002 | Biliris et al. ................... 709/238 |
| 2002/0129134 | A1 | * | 9/2002 | Leighton et al. .............. 709/223 |
| 2002/0143888 | A1 | * | 10/2002 | Lisiecki et al. ................ 709/214 |
| 2007/0055765 | A1 | | 3/2007 | Lisiecki et al. |

* cited by examiner

*Primary Examiner* — Joseph E Avellino
*Assistant Examiner* — Mark O Afolabi
(74) *Attorney, Agent, or Firm* — Larson Newman, LLP

(57) ABSTRACT

A system includes a monitoring module, a request allocation module, and a request distribution module. The monitoring module is configured to determine a resource utilization of a preferred server and a non-preferred server. The request allocation module is configured to modify an allocation scheme in response to the resource utilization of the preferred server and the non-preferred server. The request distribution module is configured to distribute a plurality of requests from a plurality of users according to the allocation scheme.

19 Claims, 5 Drawing Sheets

SYSTEM AND METHOD FOR MODIFYING AN ALLOCATION SCHEME BASED ON A RESOURCE UTILIZATION

FIELD OF THE DISCLOSURE

The present disclosure generally relates to communications networks, and more particularly relates to systems and methods for request routing optimization.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a server situated closer to the client issuing the request. CDNs either co-locate servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
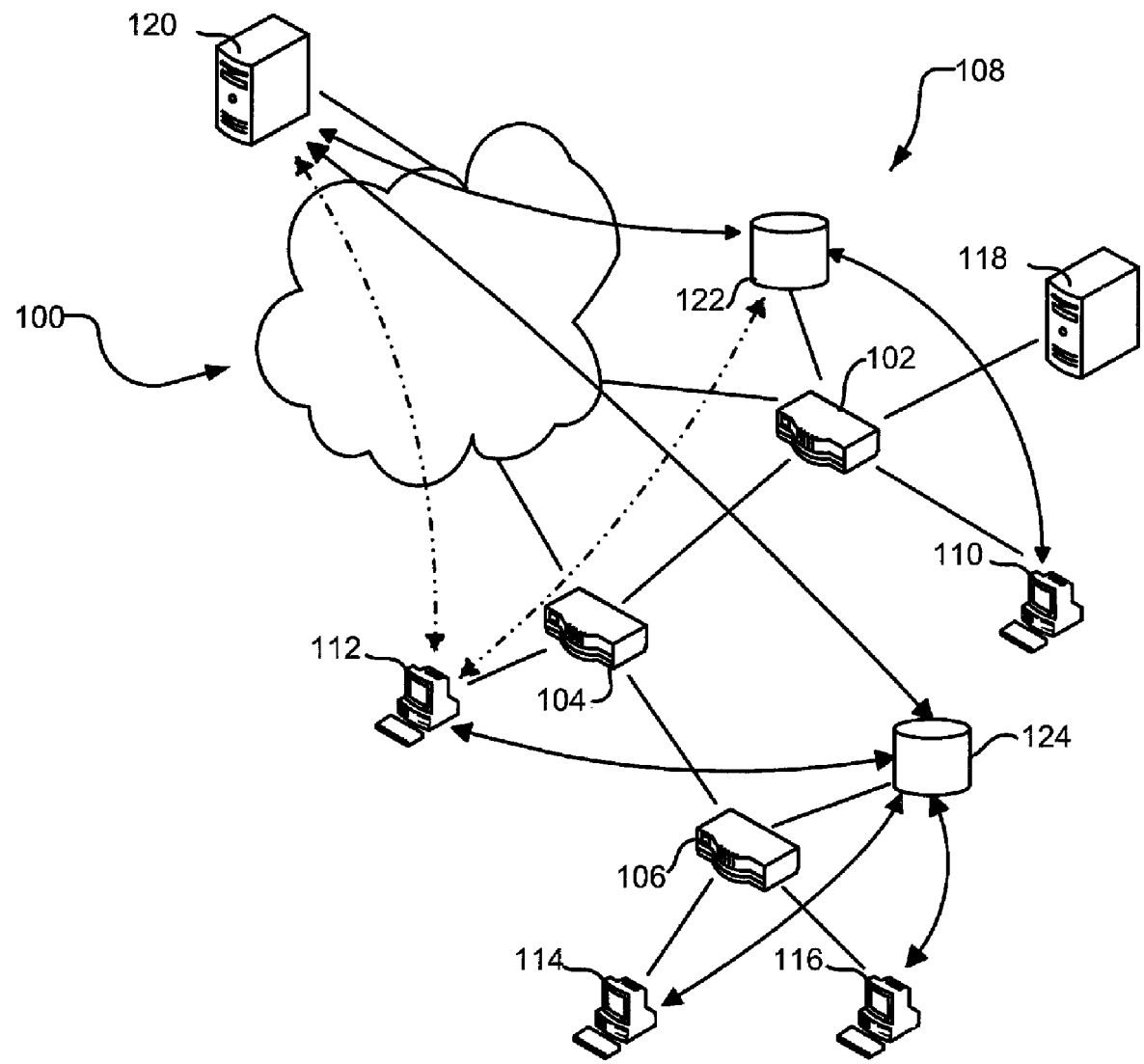
FIG. 1 is a diagram illustrating a content distribution network (CDN) in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphic, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 replicating content on the server 120 that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110 through 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

In an embodiment, the available resources of cache servers 122 and 124 can be considered when assigning cache servers 122 and 124 to client systems 110 through 116. For example, when the utilization of cache server 122 is high and the available resources are limited, client system 110 may be temporarily assigned to cache server 124. In another example, cache server 122 can be configured to handle a large number of realtime streams of audio or video content and both cache servers 122 and 124 can be configured to handle web page requests. Requests for realtime streams can be assigned to cache server 122 while web page requests can be assigned to cache server 124.

Considering the available resources when distributing requests from client systems can be especially important in a large geographically dispersed network, such as the Internet. For example, the time differences between geographic regions can result in client systems in one geographic region being more active than client systems in another geographic region, and may cause an excess load on servers located within the more active region. One approach to limit the impact to customers is to direct clients to a group of servers having a large excess capacity so that the peak demand in a region is unlikely to cause an overload to the servers. Another approach is to reallocate requests in response to server load so that new requests are directed away from an overloaded server or set of servers. However, it can be desirable to minimize the number of new requests directed to non-preferred servers in order to minimize the increased network cost and increased access time that results from serving these requests by the non-preferred servers.

Client system 112 may send a request for information to cache server 124. If cache server 124 has the information stored in a cache, it can provide the information to client system 112. This can decrease the distance that the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Figure 2:
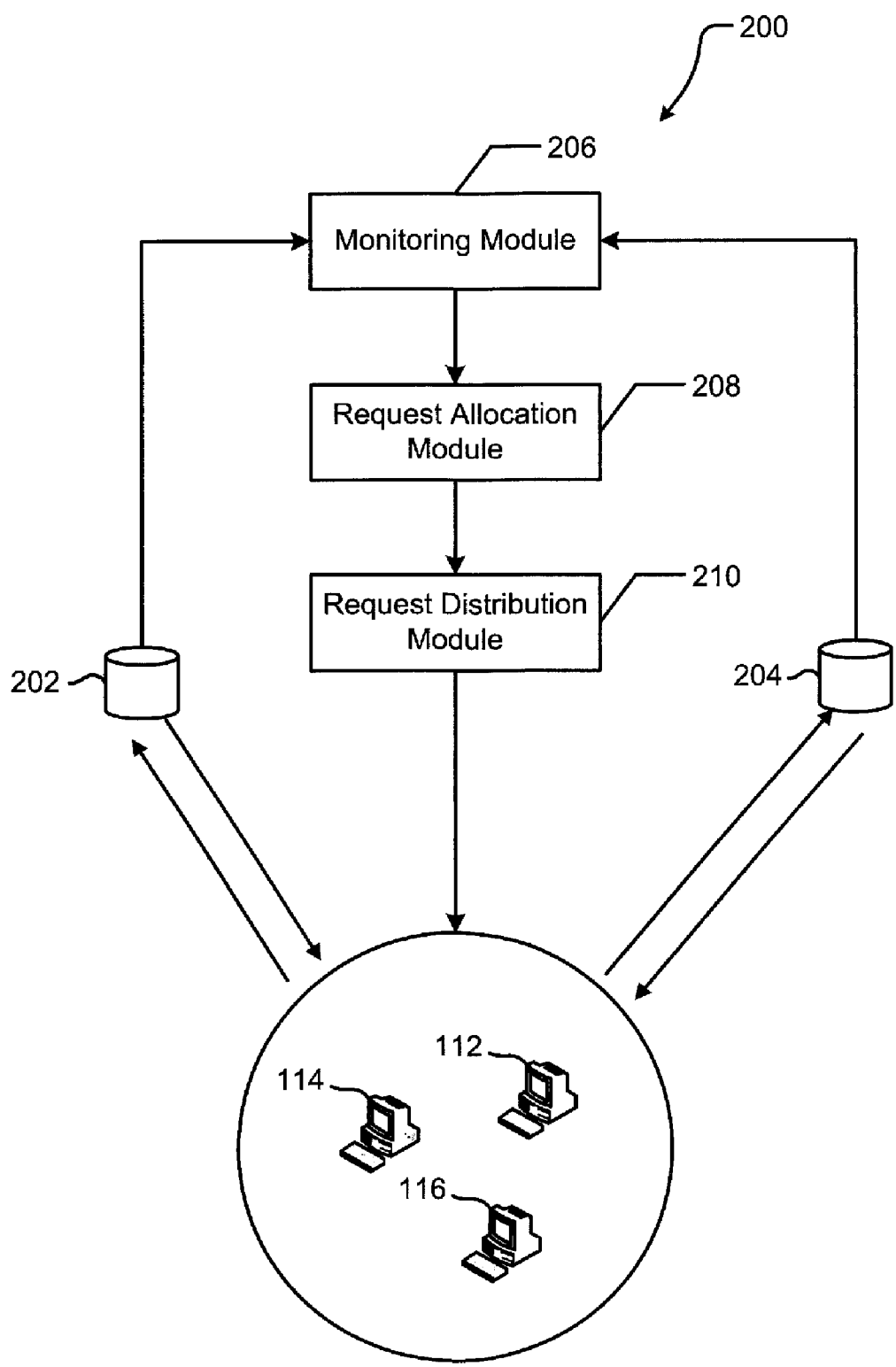
FIG. 2 is block diagram illustrating an exemplary system for routing requests.

FIG. 2 shows an exemplary request routing system 200 for routing requests for content from client systems 112 through 116. The requests can be divided between servers 202 and 204. In an embodiment, servers 202 and 204 can be cache servers of a CDN, such as cache servers 122 and 124. Additionally, server 202 may be a preferred server and server 204 may be a non-preferred server. Compared to the non-preferred server, the preferred server may have a shorter network distance to a group of clients compared to the non-preferred server. Alternatively, compared to the non-preferred server, the preferred server may have a lower resource cost for delivering content to the group of clients. For example, the network cost for delivering content to the group of clients can be lower. Alternatively, the servers may have different resources. For example, server 202 can be configured to provide both streaming content and web pages, and server 204 can be configured to provide web pages but not streaming content. Server 204 may be a preferred server for providing web pages so as to maximize the resources of server 202 available for providing streaming content.

The request routing system 200 can include a monitoring module 206, a request allocation module 208, and a request distribution module 210. In an embodiment, monitoring module 206, request allocation module 208 and request distribution module 210 can be implemented in hardware, software, or any combination thereof. Additionally, monitoring module 206, request allocation module 208 and request distribution module 210 can be implemented as part of the same virtual or physical server or as part of separate virtual or physical servers. Further, the request routing system 200 can be implemented as a centralized system or as a distributed system. The monitoring module 206 can receive resource utilization information from servers 202 and 204. The request allocation module 208 can determine a request allocation scheme based on the resource utilization information. In general, when the preferred server is overloaded, a portion of the requests can be directed to non-preferred servers with spare capacity. When the preferred server is under-utilized, relatively few requests may be directed to the non-preferred server. The request distribution module 210 can utilize the request allocation scheme to distribute requests among servers.

In an embodiment, request routing system 200 can route requests between multiple sets of servers where each set of servers can include one or more servers. The sets of servers may be prioritized such that a first set of servers is a set of preferred servers and the remaining sets of servers are sets of non-preferred servers. Additionally, the sets of non-preferred servers may be ranked so that a first set of non-preferred servers is favored over a second set of non-preferred servers when redirecting excess load requests.

In another embodiment, the request allocation module 208 can determine a request allocation scheme for multiple regions. For example, each set of servers may be located within a different region. Additionally, sets of clients may be located within each region. The request allocation module 208 can determine a request allocation scheme that directs requests from each set of clients differently so that requests from a set of clients are preferentially sent to a set of servers within the same region and excess load requests are preferentially sent to servers within a neighboring region.

In a further embodiment, the request allocation module 208 can determine a request allocation scheme for multiple services. Generally, each service may have a different set of servers. For example, the servers may be cache servers of a CDN and all servers may be configured to provide web pages with only a subset of servers configured to provide streaming content. Additionally, another set of servers may be configured to provide file downloads. Requests for streaming content may be directed only to the subset of servers configured to provide streaming content while requests for web pages can be preferentially directed to a subset of servers not configured to provide streaming content in order to reduce the load on the subset of servers configured to provide streaming content. Further, requests for file downloads can be directed to the set of servers configured to handle file downloads.

In a further embodiment, the request distribution module can be incorporated into a DNS server. When the DNS server receives a DNS request for a server IP address, the IP address provided by the DNS server can depend on the request allocation scheme. For example, when the request allocation scheme indicates that 10% of the requests should be directed to the non-preferred servers, the DNS server can provide the IP address of preferred servers in response to 90% of the DNS requests and provide the IP address of non-preferred servers in response to 10% of the DNS requests.

In another embodiment, the request distribution module can be a load balancing switch or server. When the request distribution module receives a content request from a client, the content request can be forwarded to servers based on the request allocation scheme. For example, when the request allocation scheme indicates that 10% of the requests should be directed to the non-preferred servers, the 90% of the content requests can be forwarded to the preferred servers and 10% of the content requests can be forwarded to the non-preferred servers.

Figure 3:
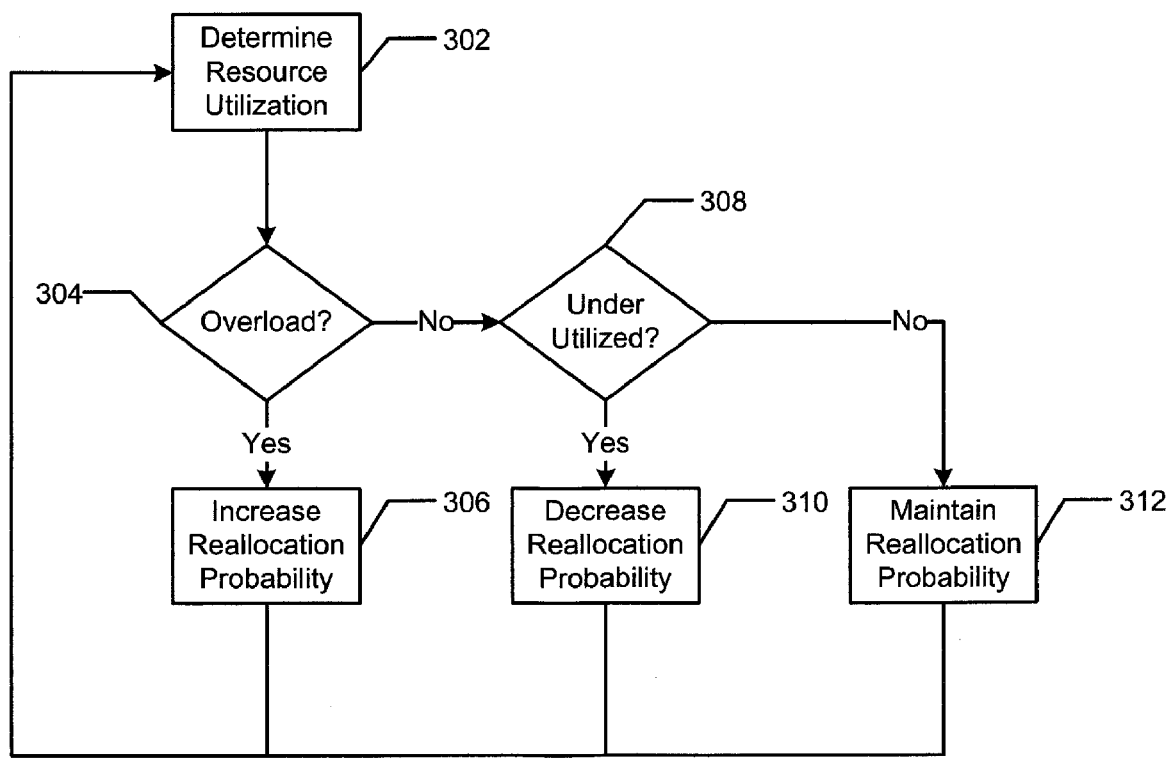
FIG. 3 is a flow diagram illustrating an exemplary method of routing requests.

FIG. 3 illustrates a method for request routing. At 302, a request routing system, such as request routing system 200, can determine the resource utilization of a plurality of servers, such as cache servers 122 and 124. For example, a monitoring module, such as monitoring module 206, may utilize simple network management protocol (SNMP) to determine CPU load, memory utilization, network utilization, and other resource utilization information from the plurality of servers. The plurality of servers can include a set of preferred servers and one or more sets of non-preferred servers. Each set of servers can include one or more servers. In an embodiment, the one or more sets of non-preferred servers can be ranked such that some sets are less preferred than other sets. At 304, the request routing system can determine if the set of preferred servers is overloaded. A preferred server can be overloaded when a resource, such as CPU utilization, memory utilization, or network utilization, is above an overload threshold. When the set of preferred servers is overloaded, the request routing system can increase a reallocation probability, as illustrated at 306. The reallocation probability is the probability that a request will be sent to a non-preferred server. The method can then return to block 302.

Alternatively, when the set of preferred servers is not overloaded, the request routing system can determine if the set of preferred servers is under-utilized at 308. The set of preferred servers can be under-utilized when resource utilization is below an under-utilized threshold. When the set of preferred servers is under-utilized, the request routing system can decrease the reallocation probability, as illustrated at 310. The method can then return to block 302.

Alternatively, when the set of preferred servers is not under-utilized, such that the resource utilization is above the under-utilized threshold and below the overload threshold, the request routing system can maintain the reallocation probability, as illustrated at 312. The method can then return to block 302.

Figure 4:
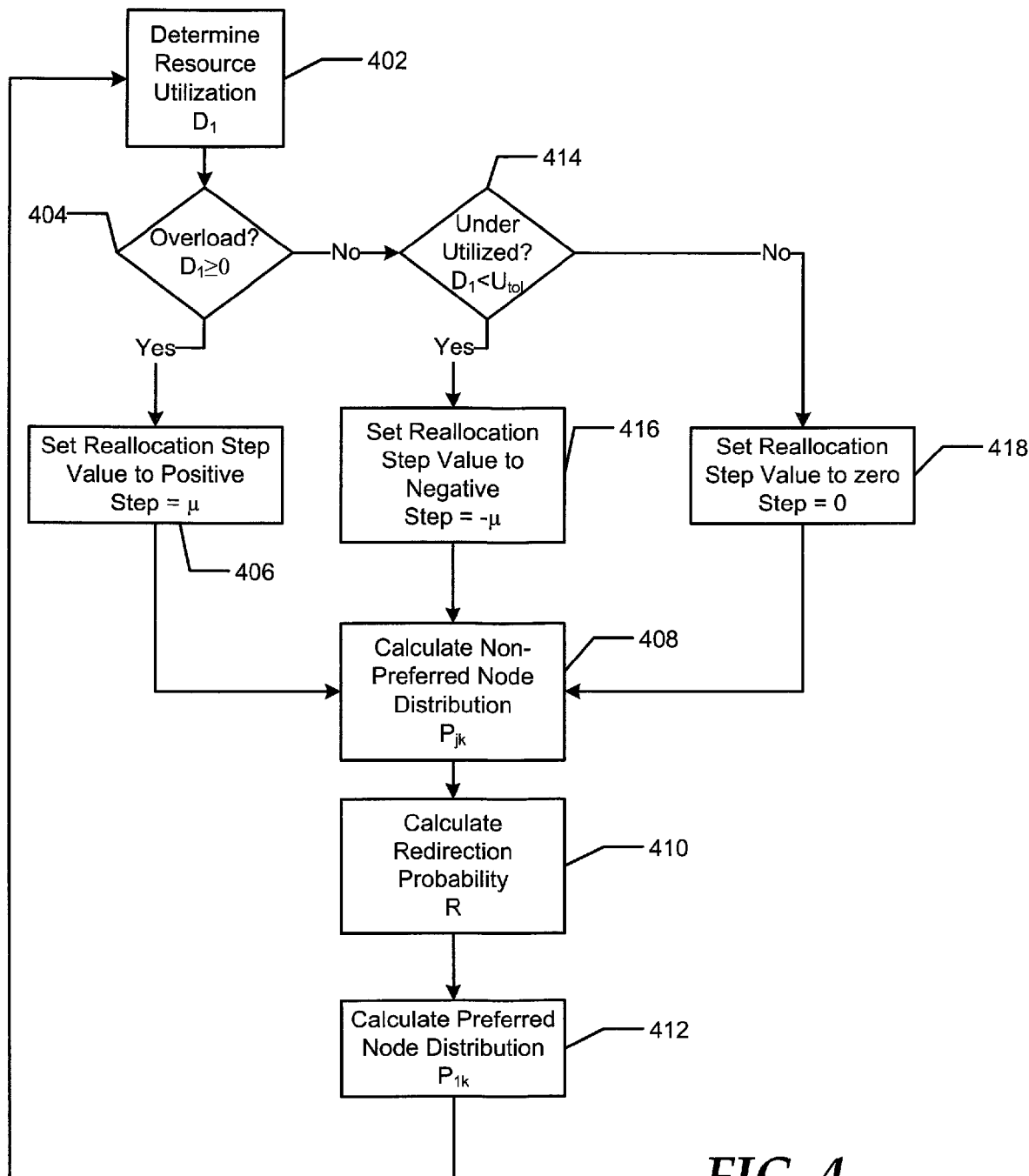
FIG. 4 is a flow diagram illustrating another exemplary method of routing requests.

FIG. 4 illustrates an alternative method for request routing. At 402, a request routing system, such as request routing system 200, can determine the resource utilization of a plurality of servers, such as cache servers 122 and 124. The plurality of servers can include a set of preferred servers and one or more sets of non-preferred servers. Each of the one or more sets of non-preferred servers may have a different priority such that excess load is preferentially redirected to a first set of non-preferred servers over a second set of non-preferred servers. In an embodiment, the request routing system can determine a spare capacity of each server ($S_{jk}$). The spare capacity can be the difference between a threshold utilization ($U_T$) and a current utilization ($U_{jk}$) for a given server, so that $S_{jk}=U_T-U_{jk}$. If a server has a current utilization greater than the threshold utilization, $S_{jk}$ is negative and that quantity can be defined as excess load and set to equal the absolute value (abs) of $S_{jk}$. Additionally, the request routing system can determine total spare capacity (TS) and total excess load (TE) for each set of servers. The total spare capacity for a set of servers can be the sum of the spare capacity for all servers in the set having a current utilization below the threshold utilization, $TS_j=\Sigma_k S_{jk}$ for $S_{jk}>0$. The total excess load for the set of servers can be the sum of the excess load for all servers in a set having a current utilization above the threshold utilization, $TE_j=\Sigma_k abs(S_{jk})$ for $S_{jk}\leq 0$. Further, the request routing system can calculate the state $D_1$ of the set of preferred servers. $D_1$ can be the difference between the total excess load and the total spare capacity for the set of preferred servers, so that $D_1=TE_1-TS_1$.

At 404, the request routing system can determine if the set of preferred servers is overloaded. When the set of preferred servers is overloaded, i.e. when $D_1 \geq 0$, the request routing system can set the reallocation step (step) value to a positive $\mu$, as illustrated at 406. In an embodiment, $\mu$ can conform to the formula $\mu=g/(abs(dU_t)+h)$, where $dU_t$ is the change in the average utilization of the preferred servers. When $\mu_{max} > \mu_{min}$, $h=\mu_{min}/(\mu_{max}-\mu_{min})$ and $g=h\mu_{max}$. Alternatively, when $\mu_{max}=\mu_{min}$, $\mu=\mu_{max}$.

At 408, the request routing system can determine a probability of directing a request to each non-preferred server. In an embodiment, the probability of directing a request to a given non-preferred server ($P_{jk}^{new}$) can conform to the formula $P_{jk}^{new}=(1+step-\Sigma_L P_{1L}^{old})*(S_{jk}A_{jk}/(j-1))/(C_{norm}A_j)$ where $P_{1L}^{old}$ is the prior probability of directing a request to a given preferred server L in the set of preferred servers, $a_{jk}$ is the processing capacity of the non-preferred server k in the set of non-preferred servers j, $A_j$ is the total processing capacity of the set of non-preferred servers j, and $C_{norm}=\Sigma_j 1/(A_j(j-1))$ $\Sigma_k S_{jk} a_{jk}$. The calculation of $P_{jk}^{new}$ can be performed for each non-preferred server in each set of non-preferred servers.

At 410, the request routing system can determine a redirection probability. In an embodiment, the redirection probability (R) can be the sum over all non-preferred servers of the probability of directing the request to a given non-preferred server $P_{jk}^{new}$. Specifically, $R=\Sigma_j \Sigma_k P_{jk}^{new}$.

At 412, the request routing system can determine the probability of directing a request to each preferred server. In an embodiment, the probability of directing a request to a given preferred server ($P_{1k}^{new}$) can comply with the formula $(1-R)U_k/\Sigma U_k$, where $U_k$ is $a_{1k}(1-(U_{1k}-U_{avg}))$, $U_{1k}$ is the utilization of the given preferred server, $U_{avg}$ is the average utilization over all preferred servers, and $\Sigma U_k$ is the sum of $U_k$ over all preferred servers. Alternatively, when $\Sigma U_k$ is not positive, $P_{1k}^{new}=0$. The method can then return to block 402.

Returning to 404, when the set of preferred servers is not overloaded, the request routing system can determine if the preferred servers are under-utilized at 414. The set of preferred servers can be under-utilized when the resource utilization is below an under-utilized threshold. When the set of preferred servers is under-utilized, the request routing system can set the reallocation step value to $-\mu$, as illustrated at 416. At 408, the request routing system can calculate the probability of directing a request to each non-preferred server, as previously discussed.

Alternatively, when the set of preferred servers is not under-utilized, such that the resource utilization is above the under-utilized threshold and below the overload threshold, the request routing system can set the reallocation step value to zero, as illustrated at 418. As previously discussed, the request routing system can calculate the probability of directing requests to each non-preferred server, as illustrated at 408.

Figure 5:
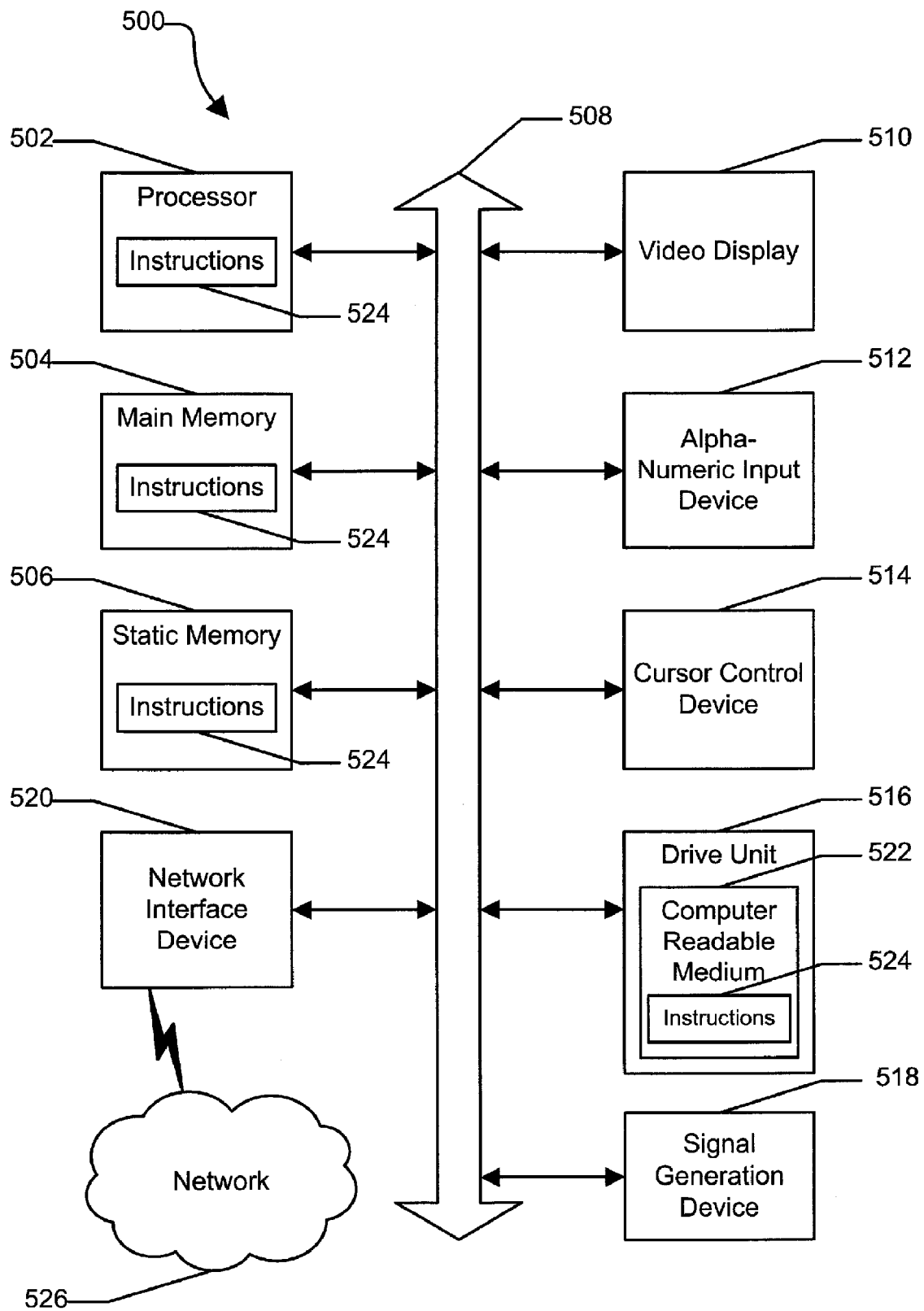
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
a processor configured to:
obtain a resource utilization of a first server and a second server, the first server configured to provide a first service to a plurality of users, the second server configured to provide the first service and a second service to the users, and the first server having a lower resource cost for providing the first service to the users than the second server, wherein the first server is a preferred server, and the second server is a non-preferred server;
modify an allocation scheme based on the resource utilization of the first and second servers, the allocation scheme indicating requests for the first service are directed to the first server and requests for the second service are directed to the second server, and the allocation scheme including a redirect probability for directing a request for the first service to the second server instead of the first server, wherein modifying the allocation scheme includes increasing the redirect probability when the resource utilization of the first server is above an overload threshold and reducing the redirect probability when the resource utilization of the first server is below an under-utilization threshold; and
wherein a plurality of requests from the users are distributed between the first and second servers according to the allocation scheme wherein the number of requests for the first service directed to the second server is proportional to the redirect probability.

2. The system of claim 1 wherein the first server has a small network distance to the plurality of users compared to the second server.

3. The system of claim 1 wherein the resource cost includes a network cost.

4. The system of claim 1 wherein distributing the plurality of requests includes providing internet protocol addresses for the first server and the second server in response to domain name system requests according to the allocation scheme.

5. The system of claim 1 wherein there is more than one set of non-preferred servers.

6. A system comprising:
a processor configured to:
obtain a resource utilization of a preferred server and a non-preferred server;
determine a step value in response to the resource utilization of the preferred server, wherein the step value is positive when the resource utilization of the preferred server is above an overload threshold and negative when the resource utilization of the preferred server is below an under-utilization threshold;
calculate a first request probability based on the step value and a prior request probability, the first request probability corresponding to the probability of directing a request to the non-preferred server; and
calculate a second request probability based on the first request probability, the second request probability corresponding to the probability of directing a request to the preferred server, wherein the preferred server has a lower resource cost for providing content to the plurality of users compared to the non-preferred server;
wherein a plurality of requests from a plurality of users are distributed between the preferred server and the non-preferred server according to the first and second request probabilities.

7. The system of claim 6 wherein the preferred server has a small network distance to the plurality of users compared to the non-preferred server.

8. The system of claim 6 wherein the resource cost includes a network cost.

9. The system of claim 6 wherein the plurality of requests arc distributed by providing interne protocol addresses for the preferred server and the non-preferred server in response to domain name system requests according to the first and second request probabilities.

10. A method comprising:
determining a resource utilization of a first server and a second server, the first server configured to provide a first service to a plurality of users, the second server configured to provide the first service and a second service to the users, and the first server having a lower resource cost for providing the first service to the users than the second server, wherein the first server is a preferred server, and the second server is a non-preferred server;
modifying an allocation scheme based on the resource utilization of the first and second server, the allocation scheme indicating requests for the first service are directed to the first server and requests for the second service are directed to the second server, and the allocation scheme including a redirect probability for directing a request for the first service to the second server instead of the first server, wherein modifying the allocation scheme includes increasing the redirect probability when the resource utilization of the first server is above an overload threshold and reducing the redirect probability when the resource utilization of the first server is below an under-utilization threshold; and
distributing a first portion of a plurality of requests for the first service from the users to the first server and a second portion of the requests to the second server according to the allocation scheme, wherein the second portion is proportional to the redirect probability.

11. The method of claim 10 wherein the first server has a small network distance to the plurality of users compared to the second server.

12. The method of claim 10 wherein the resource cost includes a network cost.

13. The method of claim 10 wherein distributing a plurality of requests includes providing interne protocol addresses for the first server and the second server in response to domain name system requests according to the allocation scheme.

14. A method comprising:
determining a resource utilization of a preferred server and a non-preferred server;
modifying a step value in response to the resource utilization of the preferred server, wherein modifying the step value includes increasing a redirect probability when the resource utilization of the preferred server is above an overload threshold and reducing the redirect probability when the resource utilization of the preferred server is below an under-utilization threshold;
calculating a first request probability based on the step value, the first request probability corresponding to the probability of directing a request to the non-preferred server;
calculating a second request probability based on the first request probability, the second request probability corresponding to the probability of directing a request to the preferred server, wherein the preferred server has a lower resource cost for providing content to the plurality of users compared to the non-preferred server; and
distributing a plurality of requests from a plurality of users according to the first and second request probabilities.

15. The method of claim 14 wherein the preferred server has a small network distance to the plurality of users compared to the non-preferred server.

16. The method of claim 14 wherein the resource cost includes a network cost.

17. The method of claim 14 wherein distributing a plurality of requests includes providing interne protocol addresses for the preferred server and the non-preferred server in response to domain name system requests according to the first and second request probabilities.

18. The method of claim 14 wherein the preferred server is one of a set of preferred servers and the non-preferred server is one of a set of non-preferred servers.

19. The method of claim 18 wherein there is more than one set of non-preferred servers.

* * * * *